Oct. 3, 1939.  E. CHAPMAN  2,174,550
HIGH-PRESSURE APPARATUS AND METHOD OF MAKING THE SAME
Filed May 11, 1936
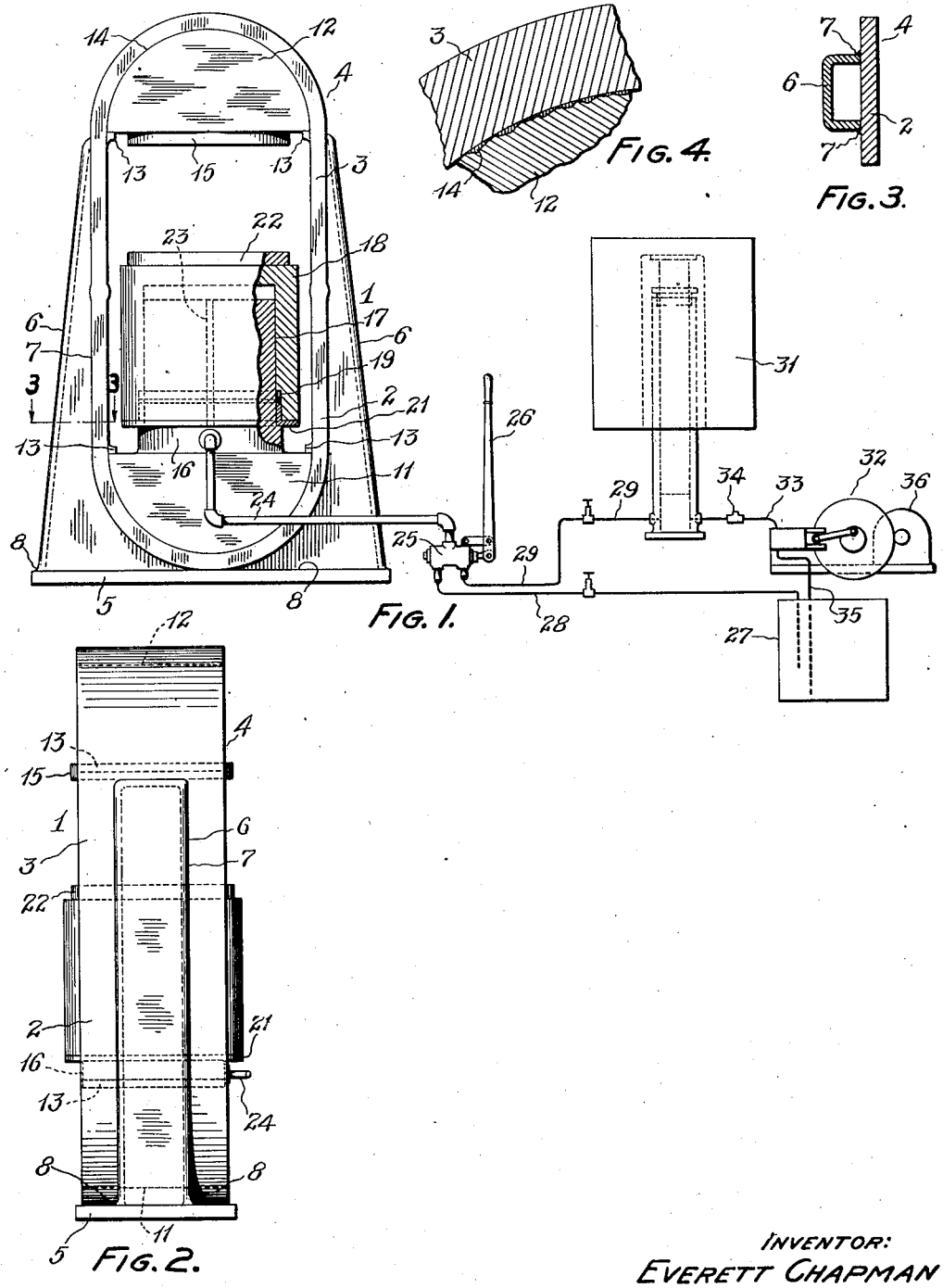
INVENTOR:
EVERETT CHAPMAN
BY Saywell & Wesseler,
ATTORNEYS Patented Oct. 3, 1939

2,174,550

UNITED STATES PATENT OFFICE 2,174,550

HIGH-PRESSURE APPARATUS AND METHOD OF MAKING THE SAME

Everett Chapman, Coatesville, Pa.

Application May 11, 1936, Serial No. 79,001

5 Claims. (Cl. 100—19)

This invention, as indicated, relates to a high pressure apparatus and method of making the same. More particularly, it comprises a press structure adapted to withstand unusual stresses and designed to provide means for withstanding the tensile and compression loads to greater advantage than any heretofore known. To bring about this result, the press frame is formed of a continuous loop of steel which, both from its form and its material, is peculiarly adapted to resist extreme tensile strains, and within said steel loop there are positioned two abutments in the form of huge cast iron slugs which serve particularly well to withstand high compression strains. The press frame in the form of an elongated open loop is formed of semicircular shape at its ends and within such end portions the cast iron plates or pads are positioned, said plates being similarly formed so as to snugly fit within the semicircular portions of the loops. Thus, with a minimum of material and with the utmost simplicity of design, there is provided a structure adapted to withstand the strains brought about through utilizing the heavy forces necessary for high duty presses.

The apparatus also minimizes undesirable bending deflections of the structural members in that the loop-shaped frame member will elongate uniformly through its side members, when subjected to heavy strains, thus maintaining parallelism in the upper and lower members or platens of the press. Thus, the upper and lower platens themselves will not be subjected to misalinement due to bending of their supports, and any dies which are placed in the press will not be deformed or distorted due to the fact that the faces of the platens are continuously maintained in parallel position. The platens themselves may be locally compressed or deformed, but the introduction of local curvature on the face is minimized because of the excess mass and strength and stiffness of the abutments and the manner in which they load the looped frame member.

Another feature which the looped frame member of steel cooperating in pure compression with the semicircular platens, as closely adjacent but elastically independent structures, brings about, is that no sudden changes of section, such as are present in most press frames, are incorporated in the press structure where the heavy strains are introduced, and that the platens and the loop frame are free to seek a mechanical adjustment with reference to each other during the period when the heavy forces are applied. This is a guarantee that no fatigue failure will occur at the junction point due to stress concentration which always results at sudden changes of contour.

Another advantageous feature brought about by the structure herein set forth is that the looped frame member can be readily fabricated, and that no unusual difficulties are presented with reference to the welded joints necessary to provide the continuous loop, as these joints may be formed in the sides of the loop and thus avoid the manufacturing difficulties involved in forming such joint on a curvilinear surface.

Heretofore it has been the practice with conventional presses to provide heavy cast iron end frame members joined by a plurality of forged steel tie rods serving as a trackway for a moving platen positioned above the piston of the hydraulic press. The load produced by the piston, working in a chamber in the lower frame member formed with an elliptical head to withstand the high pressure, when forced upwardly, would tend to deflect the top and bottom frame members and also to carry such deformation into the tie rods, thus distorting the trackway from which the moving platen is guided, and preventing the platens carrying the work being maintained as required. In present types of presses, the corner guide members are subject to heavy wear between the sliding surfaces at the instant of maximum load. Once these sliding surfaces have worn considerably, the guidance of the moving platen is indeterminate.

The loop-shaped form of press herein described, when subjected to high pressure, will tend to merely elongate uniformly and not bend the sides of the loop-shaped frame member. In such a press, the dominant stress on the cast iron is compression which is ideal for cast iron material. As is well known, steel is stronger in tension than in compression, and the steel portion of the completed press is loaded most advantageously in pure tension. Such arrangement requires the least amount of steel for a given factor of safety. The side frame members of the press may elongate slightly, but they will not be moved inwardly owing to the type of loading of the loop-shaped frame member.

In place of having the piston applied to the moving platen of the press, it has been found advantageous to place the piston upon the lower cast iron slug as a part of the stationary frame member, and to have the cylinder of the press made a part of the moving platen. This eliminates the very expensive elliptical head which would otherwise be required to withstand the pressure. The platen of the device herein set forth therefore will receive on one side the high pressure of the fluid compression chamber between the piston and the cylinder, and on the other side will have the load or the material operated upon to balance the forces set up through hydraulic pressure. The cast iron slug at the opposite end will, of course, resist the pressure applied against the moving platen by the work, but no harmful deformation of the structural parts of the press will take place inasmuch as the steel and cast iron members mutually cooperate to resist all forces, the steel serving to absorb the tensile strains, and the cast iron the compression strains, and each preventing the companion members from being deflected or displaced from their normal position.

The principal object of the present invention is to provide an improved form of high pressure apparatus.

Another object of the invention is to provide a method of forming a high pressure apparatus out of two types of material so related as to secure capacity to withstand excessive strains with a greater factor of safety than with an equivalent weight of material of other types of high pressure apparatus construction.

Another object of the invention is to provide a frame structure, for the resistance of high loads, embodying the use of steel and cast iron in the most ideal manner, theoretically and practically, with a maximum of efficiency and economy.

Another object of the invention is to provide a frame structure adapted for a variety of high pressure uses which, even though specialized as to operative members, may be economically constructed and have long service life.

Another object of the invention is to provide a hydraulic press wherein the cylinder is associated with the moving element of the press and the piston is rigidly secured to the press frame, whereby resistance to distortion is greatly increased.

Another object of the invention is to provide a hydraulic press having a frame member peculiarly adapted to resist tensile strains and subject to uniform elongation during the period of maximum load, and having moving parts guided along surfaces not subject to deformation.

Another object of the invention is to provide a high pressure apparatus having a portion thereof formed of metal peculiarly adapted to resist tensile strains and made of sheet steel members or plates shaped and assembled as an integral structure by welding operations and providing within such frame members peculiarly adapted to resist compression strains.

Other and further objects of the invention will appear in the course of the following description.

To the accomplishment of the foregoing and related ends, said invention, then, consists of the means and method hereinafter fully described and particularly pointed out in the claims, the annexed drawing and the following description setting forth in detail certain means and methods embodying the invention, such disclosed means and methods constituting, however, but several of various forms in which the principle of the invention may be used.

In said annexed drawing:

Figure 1 is a side elevation, partly diagrammatic, showing a complete hydraulic press assembly embodying the principles of the invention;

Figure 2 is an end elevation of the press structure shown in Figure 1;

Figure 3 is an enlarged detail sectional view of an end reinforcing member, taken along the line 3—3 shown in Figure 1, looking in the direction of the arrows; and Figure 4 is an enlarged detail sectional view showing the relation of the loop-shaped member and the compression resisting member adjacent the upper end of the apparatus.

As has been indicated, the apparatus comprised in the invention is adapted to a variety of uses wherein high pressures are involved, such as are developed in hydraulic presses, rolling mills, crushers, and the like. The apparatus illustrated has been shown in connection with a hydraulic press, but such use is only one of the numerous uses to which the principles of the invention may be applied.

As is clearly shown in Figure 1, the apparatus comprises a press frame 1 formed of a pair of sheet metal plates 2, 3, formed with an intermediate portion of semicircular extent preferably at a central position and providing parallel side members. The members when thus bent may be substantially U-shaped members which are then brought with their free end edges in contact and welded to provide an integral loop-shaped member 4. The plates or members are preferably formed of sheet steel or some suitable alloy adapted to withstand heavy tensile stresses. The welds connecting the two plates are preferably formed in the straight side portions of the loop-shaped member rather than in the curvilinear portions thereof in order to simplify the welding of the parts and the forming of the loop member and to maintain uniformity of thickness over the curvilinear portions of the structure.

The loop-shaped frame member may be supported in various ways, the support shown in Figure 1 comprising a base plate 5 preferably of steel, upon which the loop-shaped member is vertically supported preferably by means of tapered channel members 6 at either side, shaped at their inner edges to conform to the shape of the loop-shaped member over the greater portion of its side and bottom exterior surfaces and connected thereto by means of welds 7 extending substantially throughout the entire area of contact of the channel members with the loop-shaped member. The channel members are secured to the base plate by similar welds 8, and thus an integral structure is provided adapted to resist endwise tensile strains.

Where the apparatus is to be used as a press, the ends of the loop-shaped members are provided with abutment members 11, 12, preferably formed of cast iron or other suitable material adapted to resist heavy compression stresses. The abutment members may be held in place in various ways, but, as shown, are anchored in position by means of retaining strips 13 secured to the inner surfaces of the loop-shaped member in close fitting relation to the margins of the flat outer faces of the abutment members, and the rearward faces of said abutment members, which are of semicircular extent conforming to the inner surfaces of the loop-shaped member 4, are preferably provided intermediate said curved surfaces with a filler 14 of zinc or similar metal, as is shown more particularly in Figure 4. The abutments are thus held closely adjacent the loop ends but are elastically independent elements adapted to seek a mechanical adjustment with the loop-shaped member during the period of maximum load.

The press may be provided on the flat face of the upper abutment member 12 with a work table 15, and the opposite abutment member 11 may be provided centrally with a piston member 16 of the hydraulic press. The piston member may be provided with a working portion 17 of slightly reduced diameter, which is engaged within the inner walls of a cylinder 18 provided adjacent its lower edge with a sealing ring 19 and retaining flange 21. The upper end of the cylinder may be provided with a work table 22 adapted to cooperate with the work table 15 supported on the upper abutment and heretofore described.

The control of the position and movement of the cylinder may be effected in a number of ways, that shown comprising the conduit 23 within the piston communicating by means of a pipe line 24 with the control valve 25 of the hydraulic system. The valve may be a three-way valve actuated by the control lever 26, one side of the valve communicating with the sump 27 through a fluid return line 28, and the other side of the valve receiving pressure fluid through a pipe line 29 connected with a weighted accumulator 31. A hydraulic pump 32 serves to store power beneath the accumulator by means of a pipe line 33 having a check valve 34 communicating with the accumulator. The pump also has the supply line 35 for flowing fluid from the sump. Any suitable source of power may be utilized to operate the pump, such as an electric motor 36.

Other modes of applying the principle of my invention may be employed instead of those explained, change being made as regards the means and steps herein disclosed, provided the means stated by any of the following claims or the equivalent of such stated means be employed.

I therefore particularly point out and distinctly claim as my invention:

1. The method of forming a press consisting of the steps of bending sheet steel members into semi-circular form, providing two or more straight sheet steel members, joining by welding the semi-circular members at their ends to the ends of the straight members to form a continuous frame, reinforcing and supporting the frame in progressively increasing ratio from one end of the straight members to the base of the straight members and one semi-circular member throughout their lengths, providing semi-circular cast-iron abutments within each semi-circular section, maintaining said abutments within the semi-circular sections with their opposed base active faces in parallelism, and providing a stationary platen for one semi-circular member and a movable platen for the other semi-circular member.

2. The method of forming a press consisting of the steps of bending sheet steel members into semi-circular form, providing two or more straight sheet steel members, joining by welding the semi-circular members at their ends to the ends of the straight members to form a continuous frame, reinforcing and supporting the frame in progressively increasing ratio from one end of the straight members to the base of the straight members and one semi-circular member substantially throughout their lengths, providing semi-circular compression resisting abutments within each semi-circular section with their opposed active faces in parallelism, and providing a stationary platen for one semi-circular member and a movable platen for the other semi-circular member.

3. The method of forming a press consisting of the steps of providing a plurality of sheet steel members, bending and integrally uniting said members to form a loop-shaped frame member with semi-circular end portions and straight side portions, reinforcing and supporting said frame in progressively increasing ratio from one end of each straight side portion to the other end thereof and throughout the length of one semi-circular end portion from the end thereof which is adjacent the last named end of the straight side portion, providing semi-circular compression resisting abutments within each semi-circular end portion of said frame with their active opposed faces in parallelism, and providing a stationary platen for one semi-circular abutment and a movable platen for the other semi-circular abutment.

4. An apparatus of the character described having in combination sheet steel members integrally united at their ends to form a loop-shaped frame member with semi-circular end portions and straight side portions, and members integrally united to opposite sides of said loop-shaped frame and reinforcing and supporting the same in progressively increased ratio from one end of each of the straight portions of said loop to the base of said straight portions and the base of one semi-circular end portion substantially throughout their lengths, compression resisting abutments within each semi-circular loop end portion with the opposed active faces of such compression resisting abutments in parallelism, and a stationary platen for one semi-circular abutment, and a movable platen for the other semi-circular abutment.

5. An apparatus of the character described having in combination sheet steel members integrally united at their ends to form a loop-shaped frame member with semi-circular end portions and straight side portions, one of said end portions constituting a base, and members integrally united to the base and to a substantial portion of the opposite straight sides of said loop-shaped frame and reinforcing and supporting the same in progressively increased ratio from one end of each of the reinforcing members integrally united to the straight portions of the loop to the base of said straight portions and integrally united to the base of one semi-circular end portion substantially throughout the extent of said end portion.

EVERETT CHAPMAN.